United States Patent
Otani et al.

(10) Patent No.: US 9,941,035 B2
(45) Date of Patent: Apr. 10, 2018

(54) INSULATING SUPPORT FOR ELECTRIC DEVICE

(71) Applicant: Mitsubishi Electric Corporation, Tokyo (JP)

(72) Inventors: Hirokazu Otani, Tokyo (JP); Koichi Kaneda, Tokyo (JP); Yuji Yoshitomo, Tokyo (JP); Daisuke Yoshida, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 3 days.

(21) Appl. No.: 15/301,571

(22) PCT Filed: Apr. 4, 2014

(86) PCT No.: PCT/JP2014/059929
§ 371 (c)(1),
(2) Date: Oct. 3, 2016

(87) PCT Pub. No.: WO2015/151269
PCT Pub. Date: Oct. 8, 2015

(65) Prior Publication Data
US 2017/0117072 A1  Apr. 27, 2017

(51) Int. Cl.
*H01B 17/14* (2006.01)
*H01B 17/16* (2006.01)
(Continued)

(52) U.S. Cl.
CPC ............. *H01B 17/14* (2013.01); *H01B 17/16* (2013.01); *H02B 1/011* (2013.01); *H01B 17/00* (2013.01); *H01B 17/56* (2013.01)

(58) Field of Classification Search
CPC ......... H02B 1/011; H01L 17/14; H01L 17/16; H01L 17/00; H01L 17/56
See application file for complete search history.

(56) References Cited

U.S. PATENT DOCUMENTS 1,693,380 A * 11/1928 Gilchrest ............... H01B 17/14
                                                           174/150
1,764,419 A *  6/1930 Schramm ............... H01B 17/14
                                                           174/139
(Continued)

FOREIGN PATENT DOCUMENTS

CA     1208323 A      7/1986
JP     43-17851 B1    7/1968
(Continued)

OTHER PUBLICATIONS

International Search Report (PCT/ISA/210) dated Jun. 10, 2014, by the Japanese Patent Office as the International Searching Authority for International Application No. PCT/JP2014/059929. 2 pages.
(Continued)

*Primary Examiner* — Binh Tran
*Assistant Examiner* — Douglas Burtner
(74) *Attorney, Agent, or Firm* — Buchanan Ingersoll & Rooney PC

(57) ABSTRACT

An insulating support includes a pillar-shaped portion made of resin, a metal insert buried in one end surface of the pillar-shaped portion in an axial direction, a metal insert buried in the other end surface of the pillar-shaped portion in the axial direction, and one protrusion made of the resin and provided in a ring shape and integrally with the pillar-shaped portion on an outer circumferential surface of the pillar-shaped portion on a side of the metal insert. The metal insert includes a first cylindrical base portion and a first distal end portion. The metal insert includes a second cylindrical base portion and a second distal end portion. A whole of the first distal end portion is disposed within an extended range of the protrusion in the axial direction.

14 Claims, 3 Drawing Sheets

(51) Int. Cl.
*H02B 1/01* (2006.01)
*H01B 17/56* (2006.01)
*H01B 17/00* (2006.01)

(56) References Cited

U.S. PATENT DOCUMENTS

| | | | | | |
|---|---|---|---|---|---|
| 1,766,576 | A | * | 6/1930 | Wilder | H01B 17/16 174/151 |
| 1,961,402 | A | * | 6/1934 | Taylor | H01B 17/14 174/150 |
| 2,262,831 | A | * | 11/1941 | Burleson | H01B 17/14 156/89.12 |
| 2,275,207 | A | * | 3/1942 | Taylor | H01B 17/14 174/150 |
| 2,497,251 | A | * | 2/1950 | Wolf | H01B 17/14 174/151 |
| 3,448,343 | A | * | 6/1969 | Kershaw, Jr. | H01B 17/14 361/125 |
| 3,582,538 | A | * | 6/1971 | Killian | H01B 17/14 174/158 R |
| 3,586,758 | A | * | 6/1971 | Harmon | H01B 17/14 174/158 R |
| 3,634,609 | A | * | 1/1972 | Shimizu | H01B 17/14 174/158 R |
| 3,719,770 | A | * | 3/1973 | Richardson, Jr. | H01B 17/14 16/312 |
| 3,737,560 | A | * | 6/1973 | Takatori | H01B 17/16 174/158 R |
| 4,035,578 | A | * | 7/1977 | Glasson | H01B 17/14 174/178 |
| 4,129,745 | A | * | 12/1978 | Korischum | H01B 17/14 174/209 |
| 4,724,284 | A | * | 2/1988 | Wheeler | B29C 65/66 156/294 |
| 4,740,659 | A | * | 4/1988 | Kunieda | H01B 17/42 174/211 |
| 4,757,162 | A | * | 7/1988 | Dumora | H01B 17/14 174/137 B |
| 4,853,492 | A | * | 8/1989 | Hussey | H01B 17/14 174/173 |
| 4,973,798 | A | * | 11/1990 | Parraud | H01B 17/14 174/158 R |
| 5,011,717 | A | * | 4/1991 | Moriya | H01B 17/14 174/137 A |
| 5,516,987 | A | * | 5/1996 | Itoh | H01B 17/14 174/142 |
| 6,303,870 | B1 | * | 10/2001 | Nazaryan | H01B 17/00 174/155 |
| 6,901,646 | B2 | * | 6/2005 | Yoon | H05K 7/142 174/138 D |
| 8,414,321 | B2 | * | 4/2013 | Schuldt | H01R 13/11 361/807 |
| 9,631,991 | B2 | * | 4/2017 | Tohyama | G01L 9/0051 |
| 9,741,475 | B2 | * | 8/2017 | Elder | H01B 17/583 |
| 2004/0001298 | A1 | * | 1/2004 | Henricks | H01B 17/16 361/118 |
| 2013/0025912 | A1 | * | 1/2013 | Hoefner | H01B 17/14 174/156 |
| 2014/0060891 | A1 | * | 3/2014 | Deshaies | H02G 3/30 174/163 R |
| 2016/0197458 | A1 | * | 7/2016 | Yoshitomo | H01B 17/16 248/176.1 |
| 2016/0325763 | A1 | * | 11/2016 | Li | H01B 17/525 |

FOREIGN PATENT DOCUMENTS

| | | | | |
|---|---|---|---|---|
| JP | 51-640 | Y1 | 1/1976 | |
| JP | 57-095110 | A | 6/1982 | |
| JP | 58-151809 | A | 9/1983 | |
| JP | 61-254015 | A | 11/1986 | |
| JP | 02021515 | A * | 1/1990 | H01B 17/24 |
| JP | 1-99712 | | 4/1991 | |
| JP | 05-234441 | A | 9/1993 | |
| JP | 06-162854 | A | 6/1994 | |
| JP | 11-260169 | A | 9/1999 | |
| JP | 11-306887 | A | 11/1999 | |
| JP | 2000-100266 | A | 4/2000 | |

OTHER PUBLICATIONS

Japanese International Search Report (PCT/ISA/220) dated Jun. 10, 2014, by the Japanese Patent Office as the International Searching Authority for International Application No. PCT/JP2014/059929. 4 pages.

Written Opinion (PCT/ISA/237) dated Jun. 10, 2014, by the Japanese Patent Office as the International Searching Authority for International Application No. PCT/JP2014/059929. 3 pages.

\* cited by examiner

INSULATING SUPPORT FOR ELECTRIC DEVICE

FIELD

The present invention relates to an insulating support for an electric device such as an electric power switchgear.

BACKGROUND

An electric power switch device is a main circuit switchgear disposed between a generator and a main transformer in a power plant and the like. A live part, which is a main body of the electric power switch device, is insulated and supported by an insulating support disposed on a mounting surface in the atmosphere.

The insulating support needs to be able to withstand a weight of the live part and an operation load associated with a switching operation, and thus requires a certain mechanical strength.

In addition, a fold may be provided in the insulating support. An object of the fold is to ensure a dielectric strength by lengthening a creeping distance in advance to lengthen a leakage length since insulation performance is degraded when a surface of the insulating support is stained.

Further, in a general configuration, metal inserts are provided on both end surfaces of the insulating support to fix the insulating support to each of the live part and the mounting surface.

Furthermore, Patent Literature 1 discloses a configuration in which metal fittings are buries in both end surfaces of a pillar-shaped portion made of resin included in a resin insulator, and a fold for ensuring a surface dielectric strength is provided on an external surface of the pillar-shaped portion.

CITATION LIST

Patent Literature

Patent Literature 1: Japanese Patent Application Laid-Open No. H11-306887

SUMMARY

Technical Problem

As described in the foregoing, an insulating support requires a mechanical strength as a support structure.

Meanwhile, a distal end portion of a metal insert is a place at which strength is weakest in the insulating support since a cross-sectional area of resin becomes smaller in a place in which the metal insert is buried, resin is easily separated in the distal end portion of the metal insert, and the insulating support is fractured from a separated place in a strength test.

In this regard, in a conventional scheme, a cross section of the insulating support has been equally increased to ensure the mechanical strength of the insulating support in the distal end portion of the metal insert. That is, the mechanical strength of the insulating support has been ensured by equally increasing a diameter of the insulating support.

However, in such a conventional structure, since the diameter of the insulating support equally becomes larger, a weight increases, and cost increases due to material cost.

The invention has been conceived in view of the above description, and an object of the invention is to provide an insulating support for an electric device capable of achieving weight reduction and low cost while ensuring a mechanical strength and a dielectric strength.

Solution to Problem

According to an aspect of the present invention in order to solve the above-mentioned problems and achieve the object, there is provided an insulating support for an electric device, the insulating support insulating and supporting a main electric device body from below, the insulating support including: a pillar-shaped portion made of resin; a first metal insert buried in one end surface of the pillar-shaped portion in an axial direction; a second metal insert buried in the other end surface of the pillar-shaped portion in the axial direction; and one protrusion made of the resin and provided in a ring shape and integrally with the pillar-shaped portion on an outer circumferential surface of the pillar-shaped portion on a side of the first metal insert, wherein the first metal insert includes a first cylindrical base portion fixed to a mounting surface and a first distal end portion integrally provided at a distal end of the first base portion, the first distal end portion having an external surface including a convexly and smoothly curved surface, wherein the second metal insert includes a second cylindrical base portion fixed to the main electric device body and a second distal end portion integrally provided at a distal end of the second base portion, the second distal end portion having an external surface including a convexly and smoothly curved surface, and wherein a whole of the first distal end portion is disposed within an extended range of the protrusion in the axial direction.

Advantageous Effects of Invention

According to the invention, there is an effect that it is possible to provide an insulating support for an electric device capable of achieving weight reduction and low cost while ensuring a mechanical strength and a dielectric strength.

DESCRIPTION OF EMBODIMENTS

Hereinafter, a detailed description will be given of an insulating support for an electric device according to an embodiment of the invention on the basis of drawings. It should be noted that the invention is not restricted by the embodiment.

Embodiment

Figure 1:
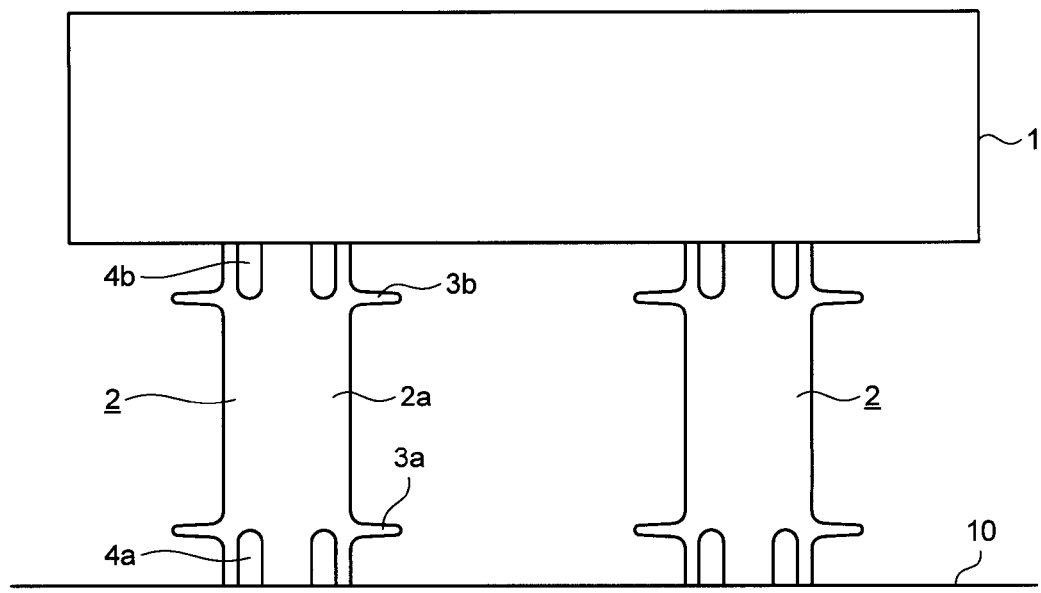
FIG. 1 is a diagram illustrating a configuration of an electric device according to an embodiment.

FIG. 1 is a diagram illustrating a configuration of an electric device according to the present embodiment. The electric device according to the present embodiment includes a main electric device body 1 and an insulating support 2 that insulates and supports the main electric device body 1 from below on a mounting surface 10.

For example, the electric device is an electric power switch device. The electric power switch device is a main circuit switchgear disposed between a generator and a main transformer in a power plant, a substation, or the like. When the electric device is the electric power switch device, the main electric device body 1 is a live part. For example, the mounting surface 10 is a surface of a metal plate, a frame, or the like placed on a ground or a floor. The mounting surface 10 is a ground plane. In addition, the electric device is disposed in the atmosphere. In FIG. 1, a longitudinal section of the insulating support 2 is illustrated.

The insulating support 2 includes a pillar-shaped portion 2a that is made of resin and extends in an axial direction, a metal insert 4a (first metal insert) buried in one end surface of the pillar-shaped portion 2a in the axial direction, a metal insert 4b (second metal insert) buried in the other end surface of the pillar-shaped portion 2a in the axial direction, one protrusion 3a made of the resin and provided in a ring shape and integrally with the pillar-shaped portion 2a on an outer circumferential surface of the pillar-shaped portion 2a on a side of the metal insert 4a, and one protrusion 3b made of the resin and provided in a ring shape and integrally with the pillar-shaped portion 2a on the outer circumferential surface of the pillar-shaped portion 2a on a side of the metal insert 4b. Hereinafter, the "axial direction" is an axial direction of the pillar-shaped portion 2a. For example, it is preferable that a plurality of insulating supports 2 be provided.

For example, the insulating support 2 is made of epoxy resin, and the pillar-shaped portion 2a and the protrusions 3a and 3b are integrally formed. For example, the pillar-shaped portion 2a has a cylindrical shape.

For example, the metal insert 4a is fixed to the mounting surface 10 through a bolt, and the like. For example, the metal insert 4b is fixed to the main electric device body 1 through a bolt, and the like. For example, it is preferable that a plurality of metal inserts 4a and a plurality of metal inserts 4b be provided.

Figure 2:
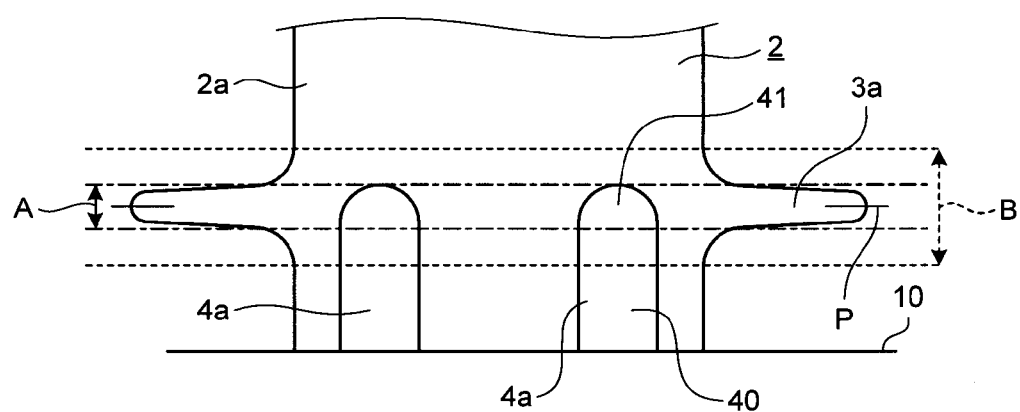
FIG. 2 is an enlarged view illustrating a configuration around a metal insert on a side of a mounting surface.

FIG. 2 is an enlarged view illustrating a configuration around the metal insert 4a. The metal insert 4a has a cylindrical base portion 40 (first base portion) fixed to the mounting surface 10 of the insulating support 2, and a distal end portion 41 (first distal end portion) integrally provided at a distal end of the base portion 40 and has an external surface including a convexly and smoothly curved surface.

The base portion 40 is buried from an end surface of the pillar-shaped portion 2a on a side of the mounting surface 10. For example, the insulating support 2 is bolted to the mounting surface 10 through the base portion 40.

The distal end portion 41 has, as an external surface, a convexly and smoothly curved surface toward a side of the metal insert 4b. In addition, the distal end portion 41 is smoothly connected to the base portion 40 such that the distal end portion 41 is not angulated. For example, the distal end portion 41 preferably has a hemispherical shape.

In FIG. 2, an extended range of the protrusion 3a in the axial direction is indicated by B. That is, B is a range of a base of the protrusion 3a in the axial direction on an external surface of the pillar-shaped portion 2a, and the protrusion 3a is connected to the pillar-shaped portion 2a in a range of B in the axial direction. In addition, in FIG. 2, an extended range of the distal end portion 41 in the axial direction is indicated by A.

As illustrated in FIG. 2, in the present embodiment, the range indicated by A is included in the range indicated by B. That is, the whole distal end portion 41 is disposed within the extended range of the protrusion 3a in the axial direction.

In addition, in FIG. 2, a distal end position of the protrusion 3a in the axial direction is indicated by P. For example, the protrusion 3a has a mountain shape, and the distal end position P is a position of an apex. As illustrated in FIG. 2, in the present embodiment, P is included in the range indicated by A. That is, the distal end position of the protrusion 3a is disposed within the extended range of the distal end portion 41 in the axial direction. This case includes a case in which P is positioned at an upper end or a lower end of A.

Figure 3:
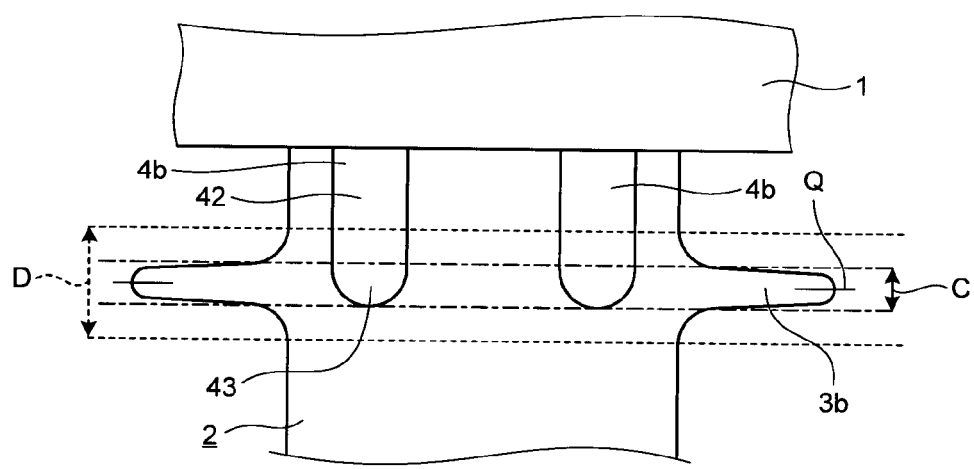
FIG. 3 is an enlarged view illustrating a configuration around the metal insert on a side of a main electric device body.

FIG. 3 is an enlarged view illustrating a configuration around the metal insert 4b. The metal insert 4b has a cylindrical base portion 42 (second base portion) fixed to the main electric device body 1, and a distal end portion 43 (second distal end portion) which is integrally provided at a distal end of the base portion 42 and has an external surface including a convexly and smoothly curved surface.

The base portion 42 is buried from an end surface of the pillar-shaped portion 2a on one side. For example, the insulating support 2 is bolted to the main electric device body 1 through the base portion 42.

The distal end portion 43 has, as an external surface, a convexly and smoothly curved surface toward a side of the metal insert 4a. In addition, the distal end portion 43 is smoothly connected to the base portion 42 such that the distal end portion 43 is not angulated. For example, the distal end portion 43 preferably has a hemispherical shape.

In FIG. 3, an extended range of the protrusion 3b in the axial direction is indicated by D. That is, D is a range of a base of the protrusion 3a in the axial direction on an external surface of the pillar-shaped portion 2a, and the protrusion 3b is connected to the pillar-shaped portion 2a in a range of D in the axial direction. In addition, an extended range of the distal end portion 43 in the axial direction is indicated by C.

As illustrated in FIG. 3, in the present embodiment, the range indicated by C is included in the range indicated by D. That is, the whole distal end portion 43 is disposed within the extended range of the protrusion 3b in the axial direction.

In addition, in FIG. 3, a distal end position of the protrusion 3b in the axial direction is indicated by Q. For example, the protrusion 3b has a mountain shape, and the distal end position Q is a position of an apex. As illustrated in FIG. 3, in the present embodiment, Q is included in the range indicated by C. That is, a distal end position of the protrusion 3b is disposed within the extended range of the distal end portion 43 in the axial direction. This case includes a case in which Q is positioned at an upper end or a lower end of C.

Effects of the present embodiment will be described. The insulating support 2 requires strength as a support structure. The insulating support 2 requires strength to be able to withstand a weight of the main electric device body 1, an operation load of the main electric device body 1, and vibrations due to an earthquake or the like. When the main electric device body 1 is a live part of an electric power switch device, strength with respect to an operation load associated with a switching operation is required.

Incidentally, a place at which a mechanical strength is weakest in the insulating support 2 corresponds to the distal end portions 41 and 43 of the metal inserts 4a and 4b. In most strength tests, when the insulating support is fractured, resin is separated from the distal end portions of the metal inserts, and a fracture is generated from a separated place.

In this regard, in the present embodiment, the protrusions 3a and 3b are provided at positions corresponding to positions of the distal end portions 41 and 43 of the metal inserts 4a and 4b to ensure a mechanical strength of the insulating support 2.

That is, the whole of each distal end portion 41 is configured to be disposed within the extended range of the protrusion 3a in the axial direction. In addition, the whole of each distal end portion 43 is configured to be disposed within the extended range of the protrusion 3b in the axial direction.

According to such a configuration, a cross-sectional area of resin in the distal end portions 41 and 43, which correspond to weak points in terms of mechanical strength, may be increased, and thus the mechanical strength of the insulating support 2 may be ensured.

In addition, when the protrusions 3a and 3b are provided on the external surface of the pillar-shaped portion 2a, a creeping distance may be increased. Thus, the dielectric strength of the insulating support 2 may be ensured.

Further, since the protrusions 3a and 3b are provided in the distal end portions 41 and 43, which correspond to weak points in terms of mechanical strength, a diameter of the pillar-shaped portion 2a between the protrusions 3a and 3b may be decreased as much as possible, and weight reduction and low cost can be achieved.

Furthermore, in the present embodiment, the distal end position of the protrusion 3a is configured to be disposed within an extended range of each distal end portion 41 in the axial direction, and the distal end position of the protrusion 3b is configured to be disposed within an extended range of each distal end portion 43 in the axial direction.

Such a configuration may match places (distal end positions P and Q), at which cross sections of the protrusions 3a and 3b are largest, with the distal end portions 41 and 43, and thus is most preferable in terms of mechanical strength.

In addition, in the present embodiment, each of the distal end portions 41 and 43 is formed in a hemispherical shape. In this way, an adhesion between the distal end portions 41 and 43 and resin is improved, and thus the mechanical strength of the insulating support 2 is improved.

In the present embodiment, both the protrusions 3a and 3b are provided. However, either one of the protrusions 3a and 3b may be provided. That is, it is possible to adopt not only a configuration in which only the protrusions 3a and 3b are provided as a fold on the outer circumferential surface of the pillar-shaped portion 2a, but also a configuration in which only the protrusion 3a is provided or a configuration in which only the protrusion 3b is provided.

When the main electric device body 1 vibrates due to an operation thereof, for example, when the main electric device body 1 is a live part of an electric power switch device, and the main electric device body 1 vibrates due to a switching operation, a moment load generated by vibration increases in proportion to a distance from the main electric device body 1. Therefore, in this case, a moment load applied to the metal insert 4a becomes greater, and thus at least the protrusion 3a is provided.

In a conventional insulating support, a cross section of the insulating support has been equally increased to ensure a mechanical strength of the insulating support in a distal end portion of a metal insert. That is, the mechanical strength of the insulating support has been ensured by equally increasing a diameter of the insulating support. For this reason, the diameter of the insulating support has become large, and a weight and cost has increased.

In addition, in a conventional insulating support, a fold may be provided on an external surface of a pillar-shaped portion. However, the fold is provided only to increase a creeping distance and ensure a dielectric strength, and has different effect from that of an object intended for improvement in mechanical strength of an insulating support.

Further, FIG. 6 of Patent Literature 1 discloses a resin insulator in which a fold is formed on an external surface of a columnar body made of resin. In the columnar body, a screw hole metal fitting for fixing a live part is buried in one end surface, and a screw hole metal fitting for fixing is buried in the other end surface.

However, a configuration of the same figure is different from a configuration of the present embodiment for the following reasons. First, in the same figure, a metal fitting including a screw hole is described. Thus, an external shape of the metal fitting excluding the screw hole needs to be compared with the metal inserts 4a and 4b of the present embodiment. Then, referring to the screw hole metal fitting for fixing, an external shape has a substantially rectangular cross section, and a distal end portion has a shape which is weak in terms of strength due to stress concentration. This description is similarly applied to the screw hole metal fitting for fixing the live part.

In addition, Patent Literature 1 fails to describe or imply a technical idea of improving a mechanical strength of the resin insulator by adjusting a position of the fold and a position of the distal end portion of the metal fitting. Actually, in the same figure, each of distal end portions of the screw hole metal fitting for fixing and the screw hole metal fitting for fixing the live part is generally disposed in a valley between folds. In particular, a distal end position of the fold is not disposed within an extended range of each of the distal end portions of the screw hole metal fitting for fixing and the screw hole metal fitting for fixing the live part in an axial direction.

Further, FIG. 7 of Patent Literature 1 discloses a resin insulator in which a fold is formed only in a lower half part. However, an external shape of one side of the screw hole metal fitting for fixing has a substantially rectangular cross section, which is different from a configuration in which the distal end portions 41 and 43 include convex and smooth external surfaces as in the present embodiment. This description is similarly applied to the screw hole metal fitting for fixing the live part. In addition, the other side of the screw hole metal fitting for fixing is different from an object in which the base portions 40 and 42 have cylindrical shapes as in the present embodiment. Further, the distal end position of the fold is not disposed within an extended range of the distal end portion of the screw hole metal fitting for fixing in the axial direction, and the disposition is not clearly described. Therefore, a configuration of the same figure is different from a configuration of the present embodiment.

Figure 5:
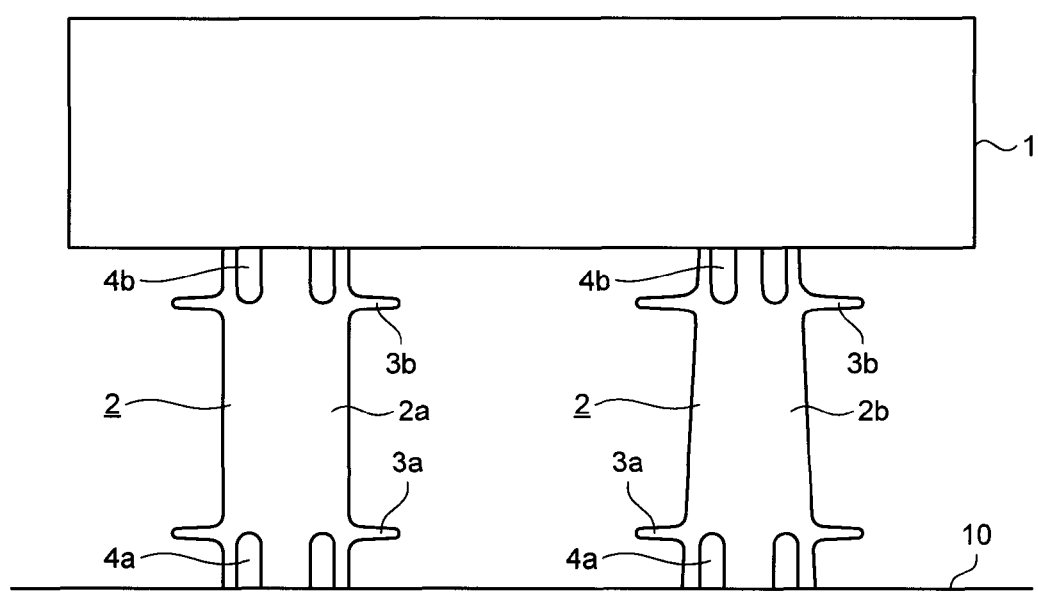
FIG. 5 is a diagram illustrating another configuration of the electric device according to the embodiment.

In the present embodiment, the pillar-shaped portion 2a is set to have the cylindrical shape. However, the pillar-shaped portion 2a may be set to have a shape of a truncated cone. FIG. 5 is a diagram illustrating another configuration of the electric device according to the present embodiment. In FIG. 5, the same reference numeral is applied to the same component as that of FIG. 1.

FIG. 5 illustrates two insulating supports 2. Here, a pillar-shaped portion 2a of one of the insulating supports 2 has a cylindrical shape, and a pillar-shaped portion 2b of the other one of the insulating supports 2 has a shape of a truncated cone. In the insulating support 2 including the pillar-shaped portion 2b, whole distal end portions of metal inserts 4a and 4b are configured to be disposed within extended ranges of protrusions 3a and 3b, respectively, in an axial direction. In this case, the extended ranges of the protrusions 3a and 3b in the axial direction are ranges obtained by projecting ranges of bases of protrusions 3a and 3b on the pillar-shaped portion 2a in the axial direction. In addition, distal end positions of the protrusions 3a and 3b are configured to be disposed within extended ranges of the distal end portions of metal inserts 4a and 4b, respectively, in the axial direction. The above description is similarly applied to the extended ranges of the distal end portions of metal inserts 4a and 4b in the axial direction.

As described in the foregoing, when the main electric device body 1 vibrates, a moment load generated by vibration increases in proportion to a distance from the main electric device body 1. Therefore, when the pillar-shaped portion 2b is set to have a shape of a truncated cone, and a diameter of the pillar-shaped portion 2b is increased in proportion to a distance from the main electric device body 1 as in the present embodiment, a mechanical strength may be increased around the metal insert 4a, and a diameter of the pillar-shaped portion 2b on a side of the metal insert 4b may be decreased, thereby the weight reduction can be achieved.

All of a plurality of insulating supports 2 that supports the main electric device body 1 may be configured using pillar-shaped portions 2b having truncated cone shapes.

In addition, the protrusions 3a and 3b are provided in FIG. 1 and FIG. 5, and the protrusion 3b exhibits barrier effect described below. The main electric device body 1 is insulated in the air. However, when dielectric breakdown and electric discharge occur, a discharge current may crawl on a surface of the insulating support 2, or discharge may occur by an electrical connection between the main electric device body 1 and the mounting surface 10 (ground plane) in the air. With regard to the latter case, when the protrusion 3b is provided on a side of the main electric device body 1 of the insulating support 2, a direct distance (insulation distance) from the main electric device body 1 to the mounting surface 10 increases, and thus insulation performance is improved (barrier effect).

Figure 4:
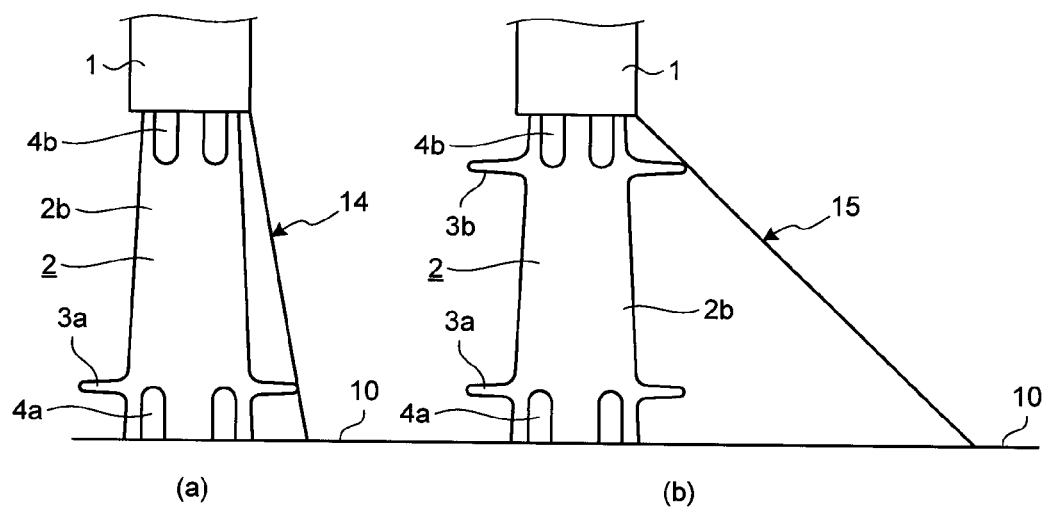
FIG. 4 is a diagram for a description of barrier effect due to a protrusion on a side of the main electric device body.

FIG. 4 schematically illustrates this description. In FIG. 4(a), the protrusion 3b is not provided in the insulating support 2. In FIG. 4(b), the protrusion 3b is provided in the insulating support 2. In FIG. 4(a), a direct distance from the main electric device body 1 to the mounting surface 10 (ground plane) is determined to be a length of a straight line 14. In FIG. 4(b), a direct distance from the main electric device body 1 to the mounting surface 10 (ground plane) is determined to be a length of a straight line 15. The length of the straight line 15 is obviously longer than the length of the straight line 14. Further, when the protrusion 3b is provided in the insulating support 2, an insulation distance in the air increases, and thus insulation performance is improved. In FIG. 4, the same reference numeral is applied to the same component as that of FIG. 1 or FIG. 5. In addition, in FIG. 4, the insulating support 2 is configured using the pillar-shaped portion 2b having the truncated cone shape. However, the above description is similarly applied even when the insulating support 2 is configured using the pillar-shaped portion 2a having the cylindrical shape.

As described in the foregoing, according to the present embodiment, it is possible to provide the insulating support 2 for the electric device capable of achieving weight reduction and low cost while ensuring a mechanical strength and a dielectric strength.

In addition, according to the present embodiment, it is possible to provide the electric device including the insulating support 2 and the main electric device body 1.

In addition, the present embodiment is suitable for a case in which the electric device is an electric power switch device.

In the present embodiment, at least one of the protrusions 3a and 3b is provided in the insulating support 2. However, a fold can be provided between the protrusions 3a and 3b in addition to the protrusions 3a and 3b.

INDUSTRIAL APPLICABILITY

As described in the foregoing, the invention is useful as an insulating support for an electric device.

REFERENCE SIGNS LIST 1 main electric device body, 2 insulating support, 2a, 2b pillar-shaped portion, 3a, 3b protrusion, 4a, 4b metal insert, 10 mounting surface, 14, 15 straight line, 40, 42 base portion, 41, 43 distal end portion.

The invention claimed is:

1. An insulating support for an electric device, the insulating support insulating and supporting a main electric device body from below, the insulating support comprising:
   a pillar-shaped portion made of resin;
   a first metal insert buried in one end surface of the pillar-shaped portion in an axial direction;
   a second metal insert buried in the other end surface of the pillar-shaped portion in the axial direction; and
   one protrusion made of the resin and provided in a ring shape and integrally with the pillar-shaped portion on an outer circumferential surface of the pillar-shaped portion on a side of the first metal insert,
   wherein the first metal insert includes a first cylindrical base portion fixed to a mounting surface and a first distal end portion integrally provided at a distal end of the first base portion, the first distal end portion having an external surface including a convexly and smoothly curved surface,
   wherein the second metal insert includes a second cylindrical base portion fixed to the main electric device body and a second distal end portion integrally provided at a distal end of the second base portion, the second distal end portion having an external surface including a convexly and smoothly curved surface, and
   wherein a whole of the first distal end portion is disposed within an extended range of the protrusion in the axial direction.

2. The insulating support for the electric device according to claim 1, wherein a distal end position of the protrusion is disposed within an extended range of the first distal end portion in the axial direction.

3. The insulating support for the electric device according to claim 2, wherein
   a plurality of the first metal inserts and a plurality of the second metal inserts are provided,
   each of the plurality of first metal inserts includes the first base portion and the first distal end portion,
   each of the plurality of second metal inserts includes the second base portion and the second distal end portion,
   a whole of each of the first distal end portions is disposed within the extended range of the protrusion in the axial direction, and the distal end position of the protrusion is disposed within an extended range of each of the first distal end portions in the axial direction.

4. The insulating support for the electric device according to claim 1, wherein only the protrusion is provided as a fold on the outer circumferential surface of the pillar-shaped portion.

5. The insulating support for the electric device according to claim 1, wherein the pillar-shaped portion has a cylindrical shape or a truncated cone shape.

6. The insulating support for the electric device according to claim 1, wherein each of the first distal end portion and the second distal end portion has a hemispherical shape.

7. The insulating support for the electric device according to claim 1, wherein the electric device is an electric power switch device.

8. The insulating support for the electric device according to claim 1, comprising
 another protrusion made of the resin and provided in a ring shape and integrally with the pillar-shaped portion on the outer circumferential surface of the pillar-shaped portion on a side of the second metal insert,
 wherein a whole of the second distal end portion is disposed within an extended range of the other protrusion in the axial direction.

9. The insulating support for the electric device according to claim 8, wherein a distal end position of the other protrusion is disposed within an extended range of the second distal end portion in the axial direction.

10. The insulating support for the electric device according to claim 9, wherein
 a plurality of the first metal inserts and a plurality of the second metal inserts are provided,
 each of the plurality of first metal inserts includes the first base portion and the first distal end portion,
 each of the plurality of second metal inserts includes the second base portion and the second distal end portion,
 a whole of each of the first distal end portions is disposed within the extended range of the protrusion in the axial direction,
 a whole of each of the second distal end portions is disposed within the extended range of the other protrusion in the axial direction,
 the distal end position of the protrusion is disposed within an extended range of each of the first distal end portions in the axial direction, and
 the distal end position of the other protrusion is disposed within an extended range of each of the second distal end portions in the axial direction.

11. The insulating support for the electric device according to claim 8, wherein only the protrusion and the other protrusion are provided as folds on the outer circumferential surface of the pillar-shaped portion.

12. The insulating support for the electric device according to claim 8, wherein each of the first distal end portion and the second distal end portion has a hemispherical shape.

13. The insulating support for the electric device according to claim 8, wherein the pillar-shaped portion has a cylindrical shape or a truncated cone shape.

14. The insulating support for the electric device according to claim 8, wherein the electric device is an electric power switch device.

* * * * *